United States Patent
Li

(10) Patent No.: US 8,605,455 B2
(45) Date of Patent: Dec. 10, 2013

(54) MOUNTING APPARATUS FOR EXPANSION CARD

(75) Inventor: Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 280 days.

(21) Appl. No.: 13/219,856

(22) Filed: Aug. 29, 2011

(65) Prior Publication Data

US 2012/0250278 A1    Oct. 4, 2012

(30) Foreign Application Priority Data

Apr. 1, 2011   (CN) .......................... 2011 1 0082115

(51) Int. Cl.
*H05K 5/00*   (2006.01)
(52) U.S. Cl.
USPC ........................... 361/759; 361/801; 361/807
(58) Field of Classification Search
USPC .................... 361/679.01, 752, 754, 756, 759, 361/801–803, 807, 809
See application file for complete search history.

(56) References Cited

U.S. PATENT DOCUMENTS

| | | | |
|---|---|---|---|
| 5,544,006 A * | 8/1996 | Radloff et al. | 361/679.32 |
| 5,831,821 A * | 11/1998 | Scholder et al. | 361/679.32 |
| 7,499,289 B2 * | 3/2009 | Liang | 361/796 |
| 8,437,139 B2 * | 5/2013 | Peng et al. | 361/748 |
| 2008/0259582 A1 * | 10/2008 | Cheng et al. | 361/801 |
| 2011/0310575 A1 * | 12/2011 | Chiu et al. | 361/759 |
| 2012/0020037 A1 * | 1/2012 | Chiu et al. | 361/759 |
| 2012/0327616 A1 * | 12/2012 | Lu et al. | 361/752 |

* cited by examiner

*Primary Examiner* — Bernard Rojas
(74) *Attorney, Agent, or Firm* — Altis Law Group, Inc.

(57) ABSTRACT

An assembly includes an expansion card, an enclosure, a mounting bracket, and a sliding member. The expansion card includes a first terminal and a second terminal. The mounting bracket secures the first terminal. A securing bracket is mounted on the enclosure. The securing bracket includes a main body on which the second terminal and a positioning piece is placed. The positioning piece includes a free end on which a first protrusion is located. The sliding member includes a pressing piece on which a second protrusion is located on. The sliding member slides on the main body between a first position and a second position. At the first position, the pressing piece presses the second terminal on the main body, and the first protrusion blocks the second protrusion. At the second position, the second protrusion slides over the first protrusion, and the pressing piece is disengaged from the second terminal.

17 Claims, 6 Drawing Sheets

MOUNTING APPARATUS FOR EXPANSION CARD

CROSS-REFERENCE TO RELATED APPLICATIONS

This application is related to co-pending U.S. patent application entitled "MOUNTING APPARATUS FOR PCI CARD," U.S. application Ser. No. 13/212,479, filed on Aug. 18, 2011, and U.S. patent application entitled "MOUNTING APPARATUS FOR PCI CARD," U.S. application Ser. No. 13/212,482, filed on Aug. 18, 2011.

BACKGROUND

1. Technical Field

The present disclosure relates to mounting apparatuses, and more particularly to a mounting apparatus for mounting expansion cards.

2. Description of Related Art

Expansion cards including network cards, monitor cards, and sound cards, are widely used in a computer. The conventional method for mounting expansion cards usually involves screws and screwdrivers in a tedious endeavor often resulting in lost screws. A screw falling on the printed circuit board (PCB) can result in damage to the PCB.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
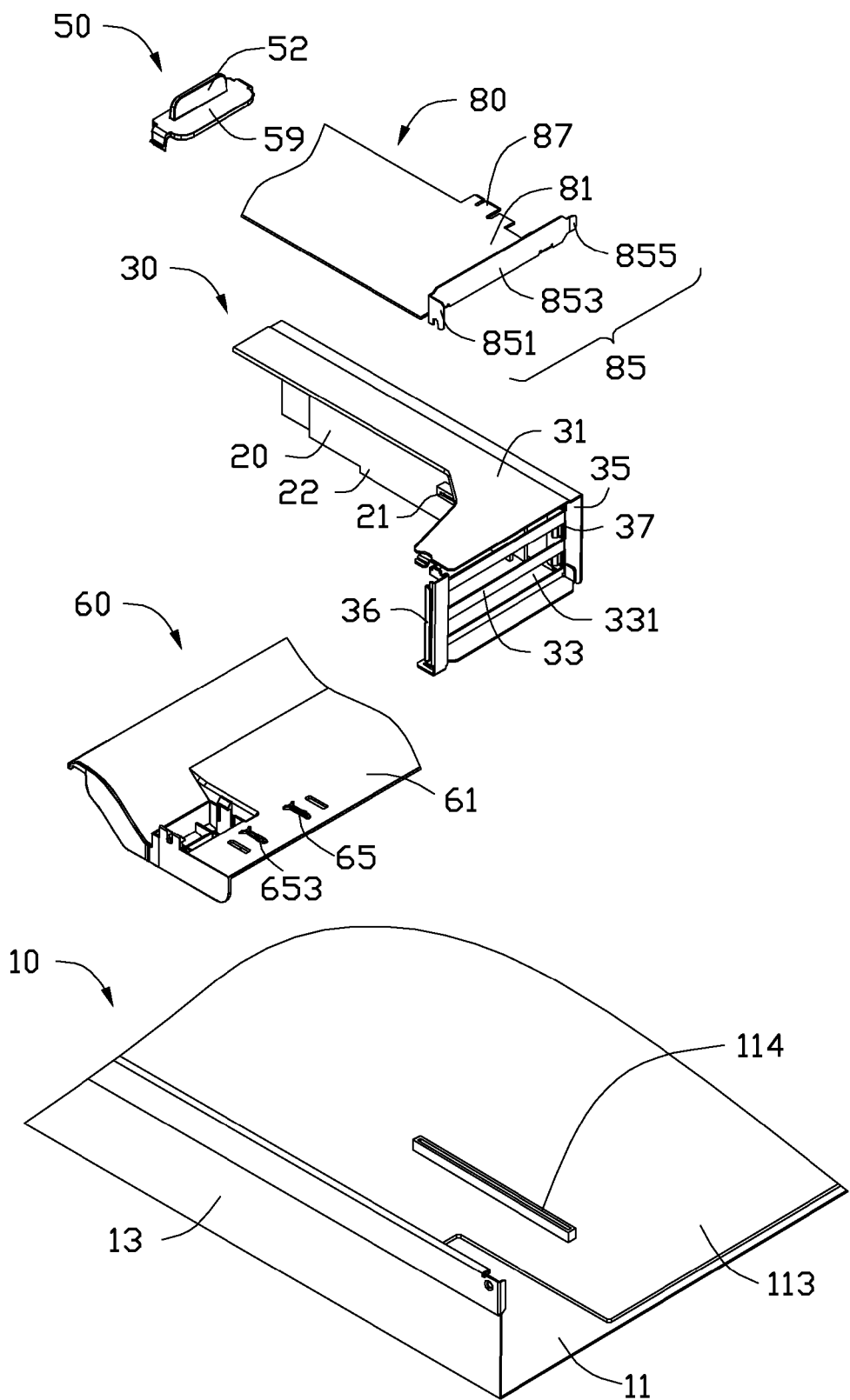
FIG. 1 is an exploded, isometric view of an embodiment of a mounting apparatus for an expansion card.

Referring to FIG. 1, a mounting apparatus for mounting an expansion card 80 is shown. The mounting apparatus includes an enclosure 10, a mounting bracket 30, a sliding member 50, and a securing bracket 60.

Figure 4:
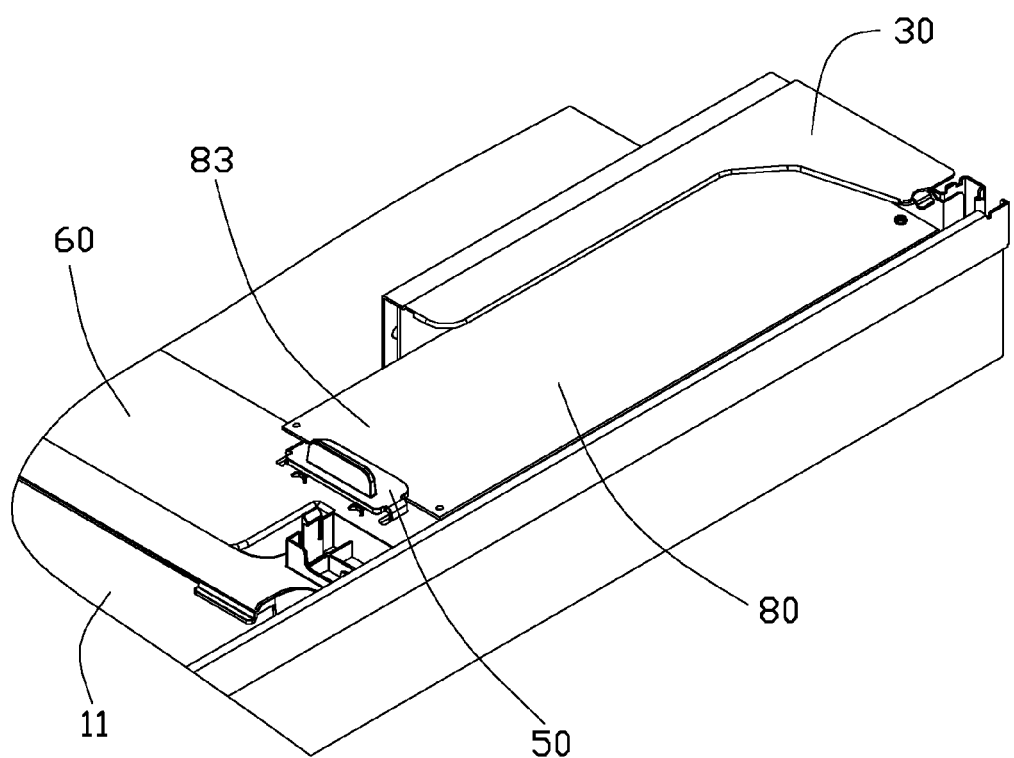
FIG. 4 is an assembly, isometric view of the mounting apparatus of FIG. 1.
Figure 5:
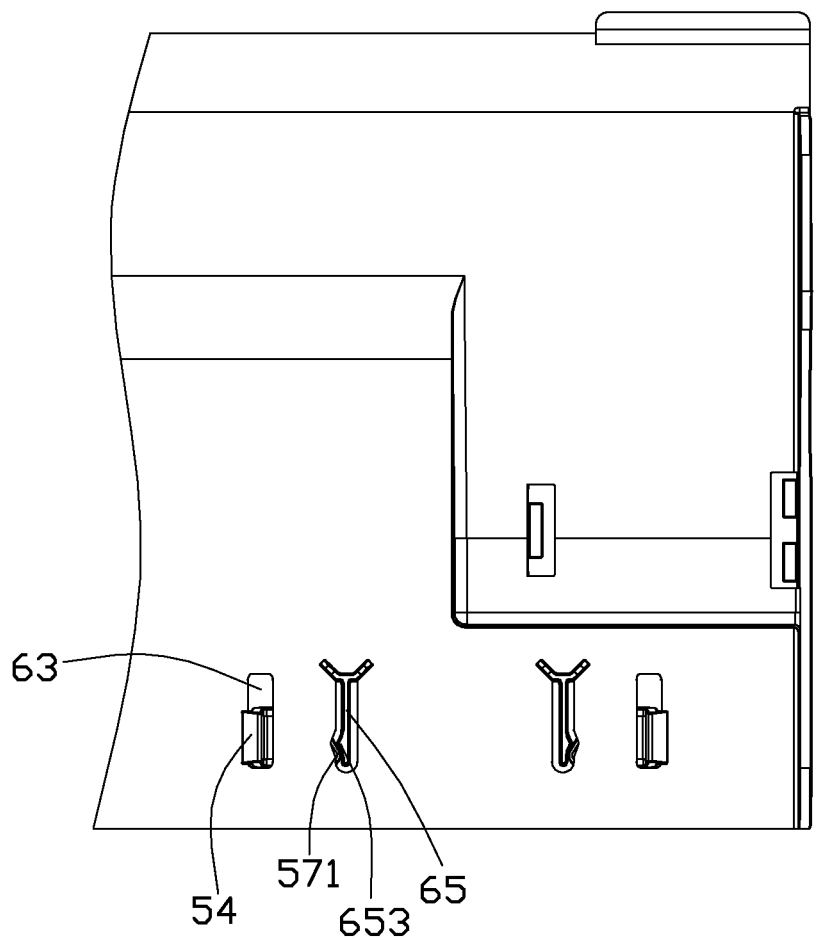
FIG. 5 is a front side view of an assembled sliding member and an enclosure of the mounting apparatus of FIG. 1.
Figure 6:
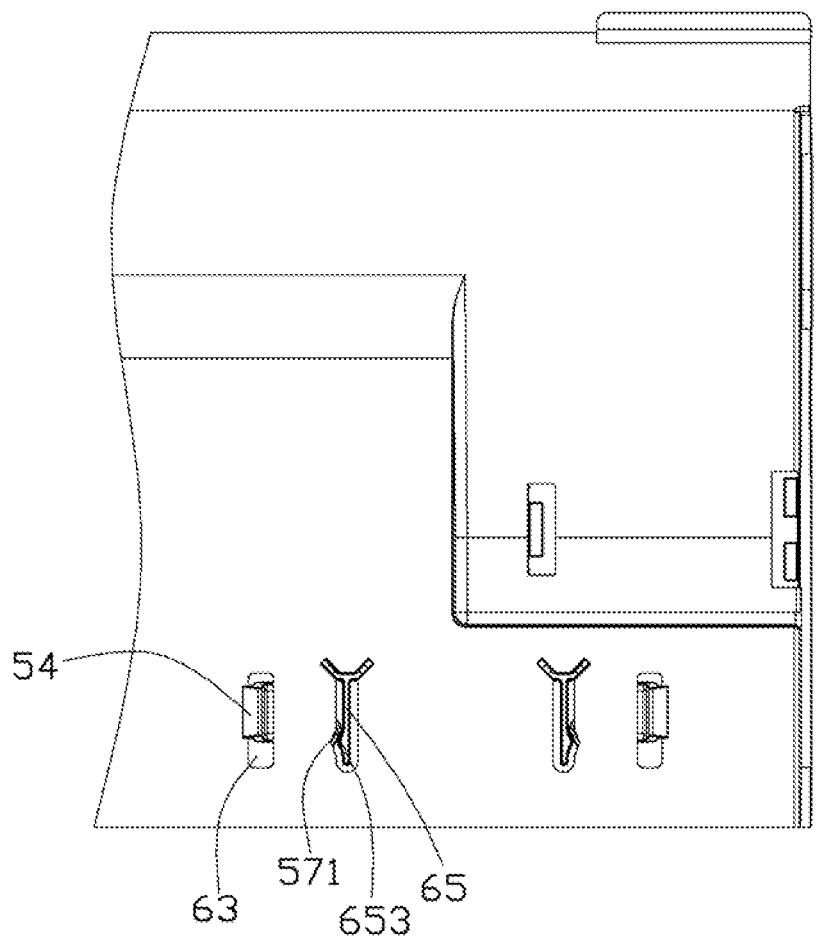
FIG. 6 is similar to FIG. 5, except the sliding member sliding to another position.

The expansion card 80 includes a first terminal 81 and a second terminal 83 (shown in FIG. 4). A mounting piece 85 is mounted on the first terminal 81. The mounting piece 85 includes a mounting portion 851, a main portion 853 extending perpendicularly from an edge of the first terminal 81, and an inserting portion 855 extending from the main portion 853. The mounting portion 851 perpendicularly extends outwards from the main portion 853. The mounting portion 851 and the inserting portion 855 are located at two opposite ends of the main portion 853, respectively. The inserting portion 855 is narrower than the main portion 853. The expansion card 80 includes an inserting terminal 87 close to the first terminal 81.

The enclosure 10 includes a bottom panel 11 and a side panel 13 substantially perpendicular to the bottom panel 11. A printed circuit board (PCB) 113 mounted on the bottom panel 11. The PCB 113 defines an insertion slot 114. The bottom panel 11 is substantially parallel to the expansion card 80.

The mounting bracket 30 includes a top plate 31, a rear plate 33, and a side plate 35. The top plate 31 is substantially perpendicular to the rear plate 33 and the side plate 35. The rear plate 33 is substantially perpendicular to the side plate 35. The rear plate 33 defines a plurality of elongated slots 331. The rear plate 33 includes a blocking tab 36. The side plate 35 defines a plurality of openings 37 corresponding to the inserting portion 855 of the mounting piece 85. A converting card 20 is mounted to the side plate 35. The converting card 20 defines a converting slot 21 corresponding to the inserting terminal 87. The converting card 20 includes an inserting head 22 corresponding to the insertion slot 114 of the PCB 113. The converting card 20 is substantially parallel to the side plate 35.

Figure 2:
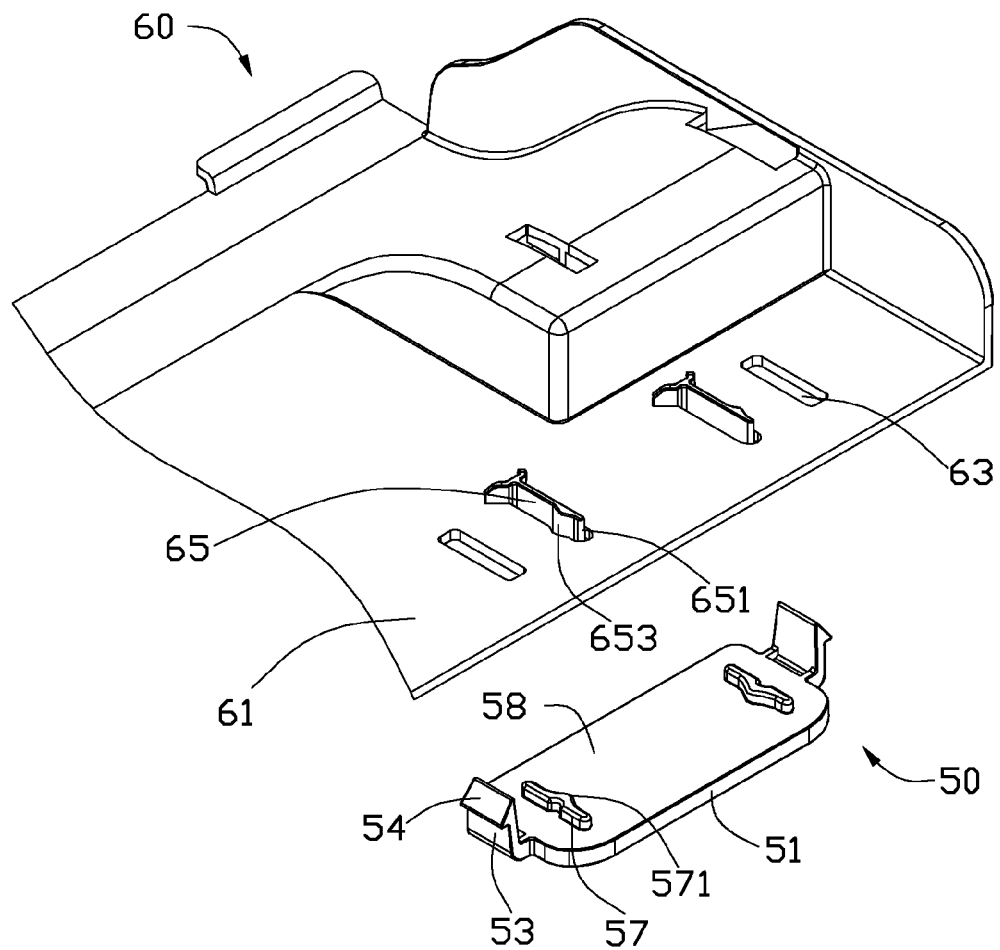
FIG. 2 is an exploded, isometric view of a securing bracket and a sliding member of the mounting apparatus of FIG. 1.

Referring to FIGS. 1 and 2, the securing bracket 60 includes a main body 61. The main body 61 defines a pair of engaging slots 63. A pair of positioning pieces 65 is located between the engaging slots 63. One end of each positioning piece 65 is secured on the main body 61, and the other end of each position piece 65 is a free end 651. The free end 651 can be elastically bent. A first protrusion 653 is formed on each positioning piece 65.

The sliding member 50 includes a pressing piece 51. Opposite edges of the pressing piece 51 extends perpendicularly to form a pair of sliding pieces 53. Each sliding piece 53 includes a clasp 54 at a distal end thereof. A pair of ribs 57 is formed on a first side 58 of the pressing piece 51. Each rib 57 has a second protrusion 571 formed thereon. A handle 52 is formed on a second side 59, which is opposite to the first side 58, of the pressing piece 51.

Figure 3:
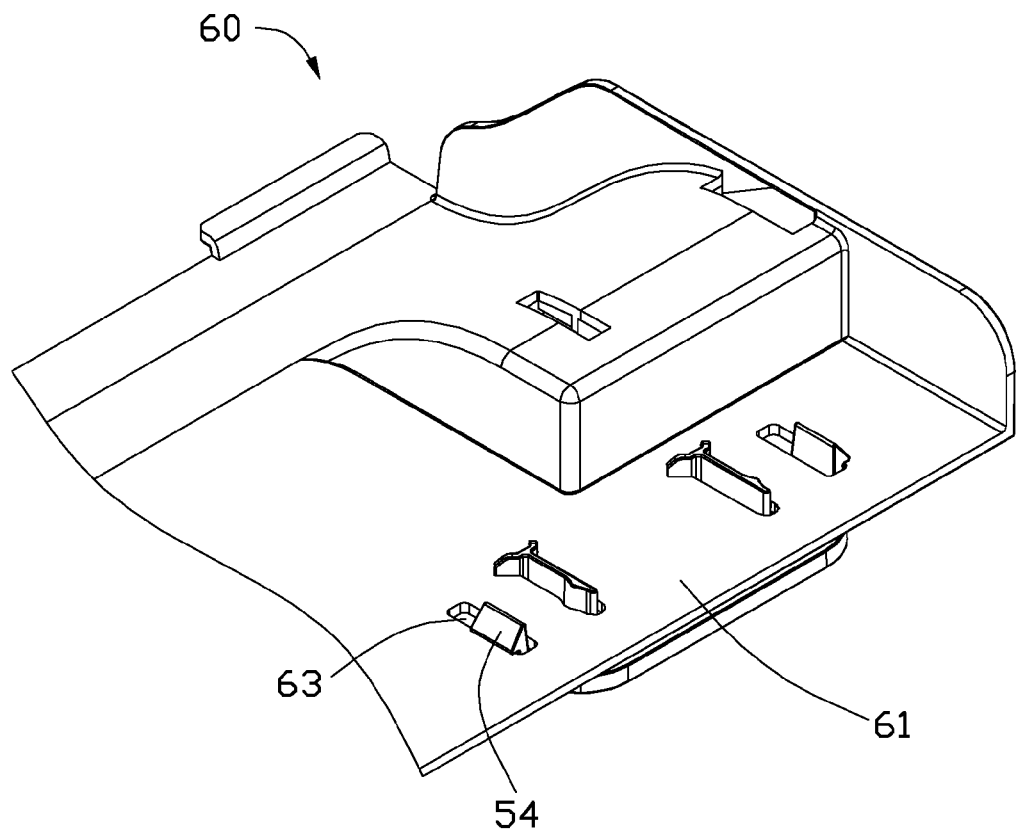
FIG. 3 is an assembly, isometric view of the securing bracket and the sliding member of FIG. 2.

Referring to FIGS. 2 to 4, in assembly of the sliding member 50 on the securing bracket 60, the sliding pieces 53 are inserted in the engaging slots 63. The clasps 54 engage on edges of the engaging slots 63. At this position, the sliding pieces 53 slide in the engaging slots 63 to slidably move the sliding member 50 on the main body 61. Then, the securing bracket 60 is secured on the bottom panel 11 according to conventional manners, such as rivets, or screws, for example.

Referring to FIGS. 1 to 6, in assembly, the mounting piece 85 of the expansion card 80 covers the elongated slot 331. The inserting portion 855 is inserted in corresponding opening 37. The inserting terminal 87 is inserted in the converting slot 21. The mounting portion 851 is located on the blocking tab 36, and is secured on the blocking tab 36 by screws or rivets.

In succession, the inserting head 22 of the converting card 20 is inserted in the insertion slot 114 of the PCB 113. The second terminal 83 of the expansion card 80 is located on the main body 61 of the securing bracket 60. Then, the handle 52 of the sliding member 50 is pushed. The sliding member 50 slides on the main body 61. The second protrusions 571 abut the first protrusions 653, and elastically deform the positioning pieces 65. The sliding member 50 slides until the second protrusions 571 slides over the first protrusions 653. The positioning pieces 65 rebound. The second protrusion 571 blocks the first protrusions 653 to prevent the sliding member 50 from sliding back freely. At this position, the pressing piece 51 of the sliding member 50 presses on the second terminal 83 of the expansion card 80. The second terminal 83 is sandwiched between the pressing piece 51 and the main body 61.

In disassembly, the handle 52 is pushes backwards to have the first protrusions 653 slide over the second protrusions 571. The pressing piece 51 disengages from the second terminal 83. The expansion card 80 is then detached.

It is to be understood, however, that even though numerous characteristics and advantages of the embodiments have been set forth in the foregoing description, together with details of the structure and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An assembly, comprising:
   an expansion card comprising a first terminal and a second terminal;
   an enclosure;
   a mounting bracket securing the first terminal of the expansion card;
   a securing bracket mounted on the enclosure, the securing bracket comprising a main body, the second terminal of the expansion card placed on the main body, a positioning piece located on the main body, the positioning piece comprising a free end on which a first protrusion is located; and
   a sliding member slidably mounted on the main body, the sliding member comprising a pressing piece, a second protrusion located on the pressing piece, wherein the sliding member is capable of sliding on the main body between a first position and a second position, at the first position, the pressing piece presses the second terminal on the main body, and the first protrusion blocks the second protrusion to prevent the sliding member sliding from the first position; at the second position, the second protrusion slides over the first protrusion, and the pressing piece is disengaged from the second terminal.

2. The assembly of claim 1, wherein one end of the positioning piece is secured on the main body, and the other end of the position piece is the free end.

3. The assembly of claim 1, wherein opposite edges of the pressing piece have a pair of sliding pieces, a pair of engaging slots is located on the main body, the pair of sliding pieces is inserted in the engaging slots, and adapted to slide in the engaging slots.

4. The assembly of claim 3, wherein a distal end of each sliding piece of the pair of sliding pieces comprises a clasp, and the clasp engages an edge of corresponding engaging slot.

5. The assembly of claim 1, wherein a rib is formed on a first side of the pressing piece, and the second protrusion is formed on the pressing piece.

6. The assembly of claim 5, wherein a handle is formed on a second side, which is opposite to the first side, of the pressing piece.

7. The assembly of claim 1, wherein the mounting bracket is mounted with a converting card, the converting card comprises a converting slot, the expansion card comprises an inserting head which is inserted in the converting slot, and the expansion card is substantially perpendicular to the converting card.

8. The assembly of claim 7, wherein a printed circuit board is mounted in the enclosure, the printed circuit board comprises an insertion slot, the converting card comprises an inserting head which is inserted in the insertion slot, and the converting card is substantially perpendicular to the printed circuit board.

9. An assembly, comprising:
   an expansion card comprising a first terminal and a second terminal, a mounting piece mounted on the first terminal;
   a mounting bracket, the mounting piece mounted on the mounting bracket;
   a securing bracket comprising a main body, the second terminal of the expansion card placed on the main body, the main body comprising a first protrusion located thereon; and
   a sliding member slidably mounted on the main body, the sliding member comprising a pressing piece, a second protrusion located on the pressing piece;
   wherein the sliding member is adapted to slide on the main body to enable the second protrusion to slide over the first protrusion and enable the pressing piece to press the second terminal on the main body.

10. The assembly of claim 9, wherein a positioning piece is located on the main body, the positioning piece comprises a free end on which a first protrusion is located.

11. The assembly of claim 10, wherein one end of the positioning piece is secured on the main body, and the other end of the position piece is the free end.

12. The assembly of claim 9, wherein opposite edges of the pressing piece have a pair of sliding pieces, a pair of engaging slots is located on the main body, the pair of sliding pieces is inserted in the engaging slots, and the sliding pieces is adapted to slide in the engaging slots.

13. The assembly of claim 12, wherein a distal end of each sliding piece of the pair of sliding pieces comprises a clasp, and the clasp engages an edge of corresponding engaging slot.

14. The assembly of claim 9, wherein a rib is formed on a first side of the pressing piece, and the second protrusion is formed on the pressing piece.

15. The assembly of claim 14, wherein a handle is formed on a second side, which is opposite to the first side, of the pressing piece.

16. The assembly of claim 9, wherein a converting card is mounted on the mounting bracket, the convening card comprises a converting slot, the expansion card comprises an inserting head which is inserted in the converting slot, and the expansion card is substantially perpendicular to the converting card.

17. The assembly of claim 16, further comprising an enclosure, wherein the mounting bracket and the securing bracket are mounted in the enclosure, a printed circuit board is mounted in the enclosure, the printed circuit board comprises an insertion slot, the converting card comprises an inserting head which is inserted in the insertion slot, and the converting card is substantially perpendicular to the printed circuit board.

* * * * *